United States Patent
Silverman et al.

(10) Patent No.: US 10,340,975 B2
(45) Date of Patent: Jul. 2, 2019

(54) FILTER DESIGN FOR ACCESS POINTS

(71) Applicant: Cisco Technology, Inc., San Jose, CA (US)

(72) Inventors: Matthew A. Silverman, Shaker Heights, OH (US); Paul J. Stager, Akron, OH (US); John Blosco, Norton, OH (US); Corey D. Metsker, Barberton, OH (US)

(73) Assignee: Cisco Technology, Inc., San Jose, CA (US)

( * ) Notice: Subject to any disclaimer, the term of this patent is extended or adjusted under 35 U.S.C. 154(b) by 13 days.

(21) Appl. No.: 15/379,726

(22) Filed: Dec. 15, 2016

(65) Prior Publication Data

US 2018/0175895 A1    Jun. 21, 2018

(51) Int. Cl.
| | |
|---|---|
| *H04W 88/08* | (2009.01) |
| *H04B 1/525* | (2015.01) |
| *H04B 1/10* | (2006.01) |
| *H04W 84/12* | (2009.01) |

(52) U.S. Cl.
CPC .......... *H04B 1/525* (2013.01); *H04B 1/1036* (2013.01); *H04W 88/08* (2013.01); *H04W 84/12* (2013.01)

(58) Field of Classification Search
CPC .......... H04B 1/1027–2001/1063; H04B 1/525; H04W 88/08
See application file for complete search history.

(56) References Cited

U.S. PATENT DOCUMENTS

| | | | |
|---|---|---|---|
| 6,629,151 B1* | 9/2003 | Bahl | H04W 28/16 370/352 |
| 8,223,862 B2 | 7/2012 | Al-Naffouri et al. | |
| 8,265,052 B2 | 9/2012 | Abhishek et al. | |
| 8,570,971 B2 | 10/2013 | Bhattad et al. | |
| 9,608,678 B1* | 3/2017 | Sun | H04B 1/10 |
| 2002/0072344 A1* | 6/2002 | Souissi | H04B 1/123 455/296 |
| 2007/0041310 A1 | 2/2007 | Tulino et al. | |
| 2013/0102254 A1* | 4/2013 | Cyzs | H04B 1/126 455/63.1 |
| 2014/0050146 A1* | 2/2014 | Chrisikos | H04W 16/14 370/328 |
| 2015/0126146 A1* | 5/2015 | Wang | H04B 1/1027 455/296 |

* cited by examiner

Primary Examiner — Gennadiy Tsvey
(74) Attorney, Agent, or Firm — Patterson + Sheridan, LLP

(57) ABSTRACT

Receiving filter design that reduces out-of-channel interference for APs is disclosed. An AP includes a first radio and a second radio disposed in a body of the AP. The first radio transmits first signals in a frequency band while the second radio receives second signals in the same frequency band. The AP includes an interference mitigation controller that determines a receiving filter for the second radio to mitigate interference between the first radio and the second radio based on the second signals received by the second radio when the first radio transmits the first signals in the frequency band. The interference mitigation controller applies the receiving filter to signals received by the second radio during a time period that the first radio is transmitting signals in the frequency band while the second radio is receiving signals in the frequency band.

14 Claims, 6 Drawing Sheets

FILTER DESIGN FOR ACCESS POINTS

BACKGROUND

The present disclosure relates to filter design for access points (APs), and more specifically, to receiving filter design for APs that can reduce out-of-channel interference.

Many APs have two radios where one of the two radios operates in the 2.4 GHz Wi-Fi frequency band while the other radio operates in the 5 GHz Wi-Fi frequency band. Because the frequency separation between the 2.4 GHz frequency band and the 5 GHz frequency band is large, the two radios operating in the two different frequency bands do not cause serious interference to each other. In other words, in these APs, the two radios can transmit and/or receive signals simultaneously without causing serious interference to each other. However, if a first radio is transmitting signals while a second radio in the AP is receiving signals in the same frequency band, the signals transmitted by the first radio may cause interference at the second radio, which can negatively affect its performance.

SUMMARY

One embodiment of the present disclosure provides an AP. The AP includes a body. A first radio is disposed in the body and configured to transmit first signals in a frequency band. A second radio is disposed in the body and configured to receive second signals in the frequency band. The AP also includes a controller. The controller is configured to determine a receiving filter for the second radio to mitigate interference between the first radio and the second radio based on the second signals received by the second radio when the first radio transmits the first signals in the frequency band. The controller is also configured to apply the receiving filter to signals received by the second radio during a time period that the first radio is transmitting signals in the frequency band while the second radio is receiving signals in the frequency band.

One embodiment of the present disclosure provides a computer program product that includes a computer-readable storage medium having computer readable program code embodied therewith. The computer readable program code determines, for an access point comprising a first radio and a second radio, a receiving filter for the second radio to mitigate interference between the first radio and the second radio based on second signals received by the second radio in a frequency band when the first radio transmits first signals in the frequency band. The first radio is disposed in a body of the access point and configured to transmit the first signals, and the second radio is disposed in the body of the access point and configured to receive the second signals. The computer readable program code applies the receiving filter to signals received by the second radio during a time period that the first radio is transmitting signals in the frequency band while the second radio is receiving signals in the frequency band.

One embodiment of the present disclosure provides a method. The method includes transmitting first signals in a frequency band by a first radio disposed in a body of an access point and receiving second signals in the frequency band by a second radio disposed in the body of the access point. The method also includes determining a receiving filter for the second radio to mitigate interference between the first radio and the second radio based on the second signals received by the second radio when the first radio transmits the first signals in the frequency band. The method further includes applying the receiving filter to signals received by the second radio during a time period that the first radio is transmitting signals in the frequency band while the second radio is receiving signals in the frequency band.

BRIEF DESCRIPTION OF THE SEVERAL VIEWS OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In United States, the 2.4 GHz frequency band has only 3 non-overlapping channels that are mostly saturated. However, the 5 GHz frequency band has 25 non-overlapping channels that provide more available channels to users. In order to utilize the ample available channels in the 5 GHz frequency band, an AP can include two radios that can operate in the same frequency band. For example, the two radios in the AP can both operate in the 5 GHz frequency band on two different channels. For this type of AP, when one radio in the AP is transmitting signals on one channel while the other radio in the AP is receiving signals on another channel in the same frequency band, the transmitted signals on one channel may cause high out-of-channel interference to the received signals on the other channel. The out-of-channel interference can negatively affect the performance of the receiving radio in the AP.

Although the two different channels in the same 5 GHz frequency band are non-overlapping channels, the two channels can be close to each other in frequency, e.g. the first channel may be the channel-36 with a center frequency at 5180 MHz, and the second channel may be the channel-40 with a center frequency at 5200 MHz. Also, the two radios in the same AP may be located proximate to each other. Thus, when one radio in the AP is transmitting signals on the first channel while the other radio in the AP is receiving signals on the second channel, the transmitted signals on the first channel may have some energy leak into the second channel, and cause high out-of-channel interference on the second channel. The embodiments below describe techniques for mitigating this interference.

Figure 1:
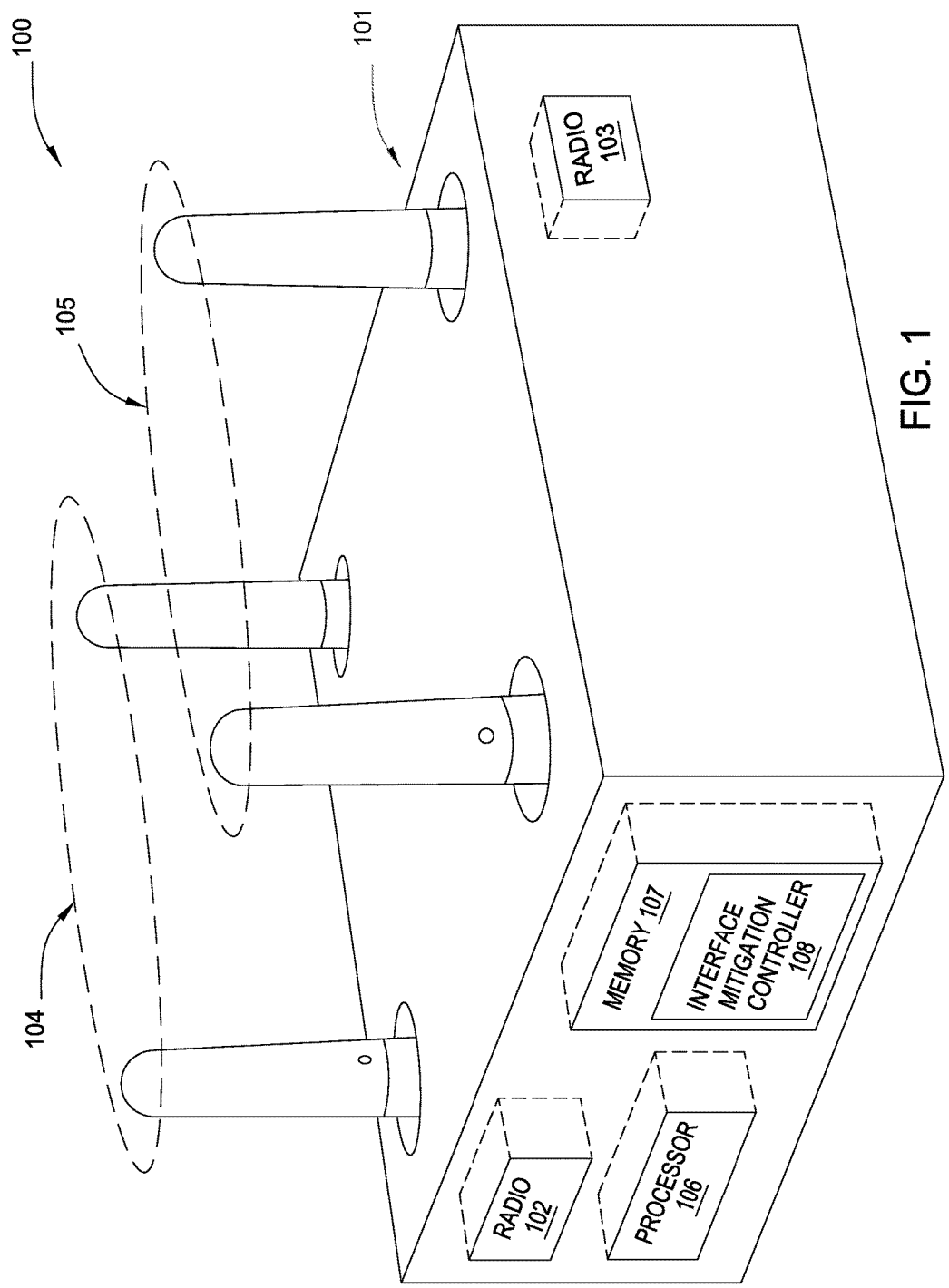
FIG. 1 illustrates an AP, according to one embodiment herein.

FIG. 1 illustrates an AP 100, according to one embodiment herein. In FIG. 1, the AP 100 includes a body 101 which includes a first radio 102 and a second radio 103. The two radios 102 and 103 operate in the same frequency band, e.g. the 5 GHz frequency band. The radio 102 transmits and receives signals through multiple antennas 104 (e.g., two antennas as shown in FIG. 1), and the radio 103 transmits and receives signals through multiple antennas 105 (e.g., two antennas as shown in FIG. 1). That is, the two radios 102 and 103 each may have a Multiple-Input Multiple-Output (MIMO) transceiver. As shown, antennas 104 and 105 are mounted to the body 101 of the AP 100.

The body 101 of the AP 100 also includes a processor 106 and a memory 107. The processor 106 may be any computer processor capable of performing the functions described herein. Although memory 107 is shown as a single entity, memory 107 may include one or more memory devices having blocks of memory associated with physical addresses, such as random access memory (RAM), read only memory (ROM), flash memory or other types of volatile and/or non-volatile memory.

The memory 107 includes an interference mitigation controller 108. The interference mitigation controller 108 determines a respective receiving filter for each of the radio 102 and the radio 103 to mitigate interference between the two radios when communicating on different channels in the same frequency band. In one embodiment, the interference mitigation controller 108 can be software. In other embodiments, the interference mitigation controller 108 can be hardware, firmware or combinations of software and hardware. For example, the interference mitigation controller 108 may include hardware components on the processor 106 (e.g., a network processor).

In one embodiment, when the radio 102 transmits signals on a first channel in the 5 GHz frequency band while simultaneously the radio 103 receives signals on a second channel in the 5 GHz frequency band, the signals transmitted from the radio 102 cause out-of-channel interference to the signals received at radio 103. In one example, the interference mitigation controller 108 determines a receiving filter for the radio 103 using the signals received by the radio 103 on the second channel when the radio 102 transmits signals on the first channel in the 5 GHz frequency band. Similarly, in another example, the interference mitigation controller 108 determines a receiving filter for the radio 102 using the signals received by the radio 102 on the first channel when the radio 103 transmits signals on the second channel in the 5 GHz frequency band. In one embodiment, the first channel is a serving channel of the radio 102, i.e., a channel assigned to the radio 102 to serve client devices. Similarly, in one embodiment, the second channel is a serving channel of the radio 103.

In some situations, applying the receiving filter decreases the MIMO receiving capacity, which is not desired. Thus, in one embodiment, the interference mitigation controller 108 does not determine the receiving filter when applying the receiving filter decreases the MIMO receiving capacity. In one embodiment, the interference mitigation controller 108 determines the receiving filter only when one radio is transmitting signals in the frequency band while the other radio is receiving signals in the same frequency band. In this embodiment, the interference mitigation controller 108 applies the receiving filter to only signals received by the receiving radio during a time period when one radio is transmitting signals in the frequency band while the other radio is receiving signals in the same frequency band. For example, the interference mitigation controller 108 determines the receiving filter for the radio 103 and applies the receiving filter determined for the radio 103 to signals received by the radio 103 only when the radio 102 is transmitting signals and the radio 103 is receiving signals in the same frequency band. In one example, when the radio 102 and the radio 103 are both receiving signals, the interference mitigation controller 108 does not determine the receiving filter for either of the two radios. In another example, when the radio 103 is receiving signals and the radio 102 is idle or powered off, e.g., not transmitting or receiving signals, the interference mitigation controller 108 does not determine the receiving filter for the radio 103.

FIG. 1 is only one embodiment of the AP 100. In other embodiments, the two radios 102 and 103 both operate in the 2.4 GHz frequency band or another frequency band different from the 5 GHz frequency band and the 2.4 GHz frequency band. That is, the interference mitigation controller 108 may generate and apply a receiving filter for other frequency bands besides 5 GHz. In other embodiments, one of the two radios 102 and 103 is an XOR radio that can dynamically switch between the 2.4 GHz and 5 GHz frequency bands. In other embodiments, the AP 100 includes more than two radios. For example, the AP 100 may include a dedicated 5 GHz radio, a dedicated 2.4 GHz radio, and an XOR radio. In other embodiments, the two radios 102 and 103 transmit and receive signals through one antenna or more than two antennas.

Figure 2:
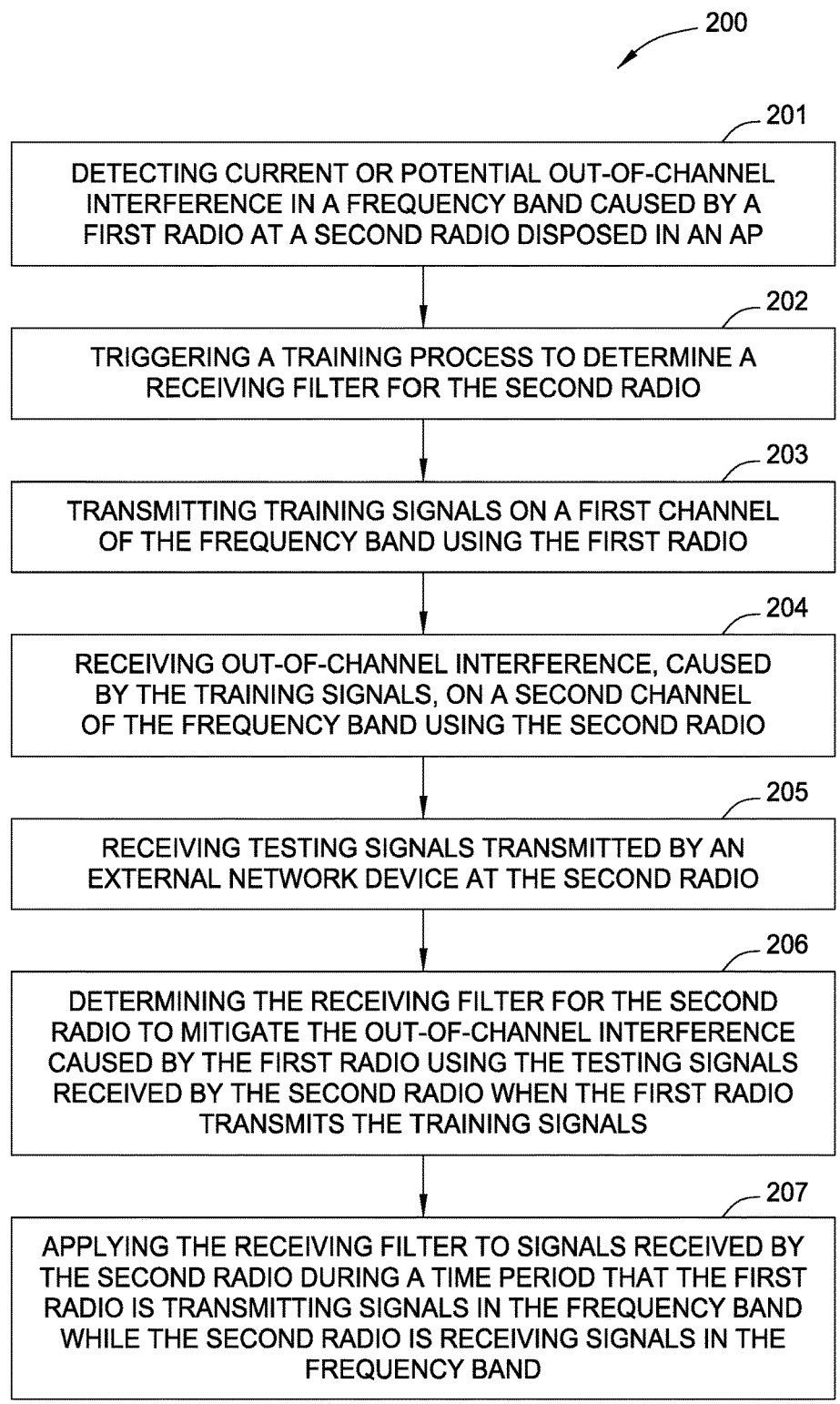
FIG. 2 illustrates a method to determine a receiving filter for the AP, according to one embodiment herein.

FIG. 2 illustrates a method 200 to determine a receiving filter for the AP, according to one embodiment herein. At block 201, the interference mitigation controller 108 detects current or potential out-of-channel interference in a frequency band, e.g., the 5 GHz frequency band, caused by the radio 102 at the radio 103. Because the radio 103 and the radio 102 are co-located in the same AP, the interference mitigation controller 108 can detect whether the radio 102 causes or will cause out-of-channel interference to the received signals of the radio 103.

For example, the interference mitigation controller 108 detects current out-of-channel interference when the radio 103 is receiving signals and the radio 102 is simultaneously transmitting signals in the same frequency band. In another example, the interference mitigation controller 108 predicts future out-of-channel interference when the radio 103 is scheduled to receive signals in the same time period the radio 102 is scheduled to transmit signals in the same frequency band.

After detecting current or potential out-of-channel interference caused by the radio 102 at the radio 103, at block 202, the interference mitigation controller 108 triggers a training process to determine a receiving filter for the radio 103. In response, the interference mitigation controller 108 initiates the training process from block 203 to block 207 to determine the receiving filter for the radio 103, as described below.

At block 203, the interference mitigation controller 108 controls the radio 102 to transmit training signals on a first channel of the frequency band. In one embodiment, the training signals include constant and/or nearly 100% high-duty cycle frames on the first channel for a training time period.

When the radio 102 is transmitting training signals on the first channel during the training period, the interference mitigation controller 108 controls the radio 103 to receive signals on a second channel of the frequency band.

Some of the energy from the transmitted training signals leaks into the second channel and causes out-of-channel interference on the second channel. Thus, as shown at block 204, the radio 103 receives out-of-channel interference caused by the training signals on the second channel.

At block 205, during the training period, the radio 103 receives testing signals from an external network device.

These testing signals enable the interference mitigation controller 108 to determine the negative impact or strength of the out-of-channel interference. That is, to determine the impact transmitting signals on the second radio has on the ability of the first radio to accurately receive data from an external source, the interference mitigation controller 108 instructs an external device to transmit the testing signals at the same time the first radio transmits the training signals.

Figure 3:
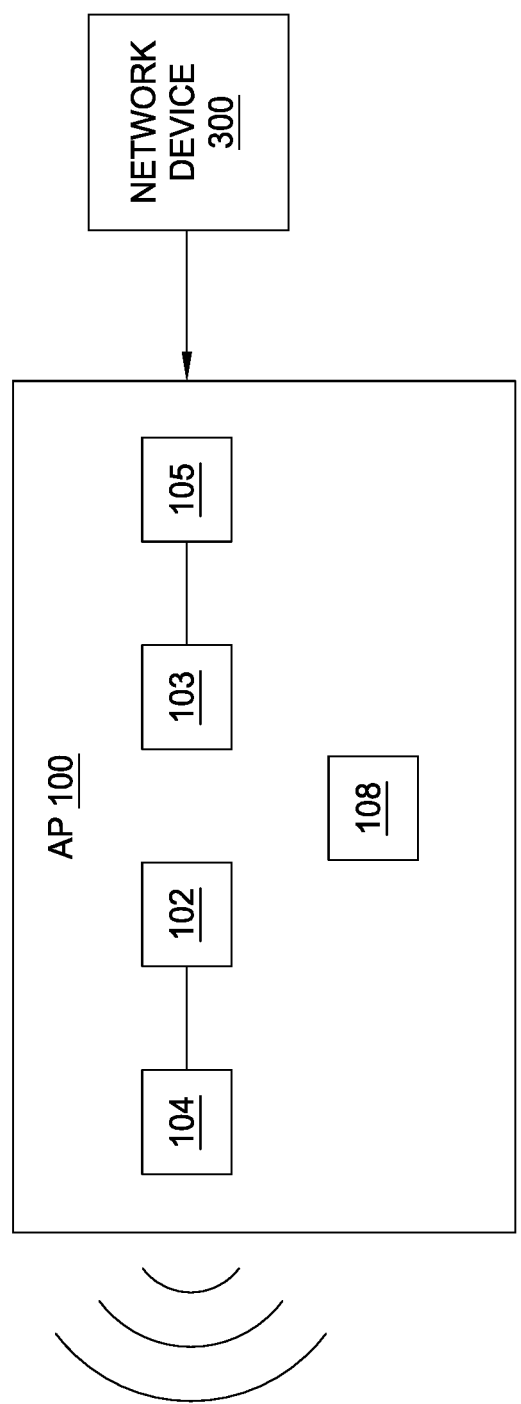
FIG. 3 shows that a radio in the AP receives signals from an external network device, according to one embodiment herein.

FIG. 3 shows the radio 103 in the AP 100 receiving testing signals from an external network device 300 during the training period, according to one embodiment herein. In one embodiment, the network device 300 is a neighboring AP. The neighboring AP 300 transmits testing signals, e.g., beacons, to the radio 103 on the second channel. In one embodiment, at block 205, the radio 103 receives beacons from the neighboring AP 300 with a known frequency, e.g., 10 beacons per second, on the second channel. The out-of-channel interference caused by the transmitted training signals from the radio 102 interferes with the ability of the radio 103 to receive the testing signals emitted by the neighboring AP 300. Thus, at block 205, the radio 103 may not receive all the beacons from the neighboring AP 300. In one embodiment, the interference mitigation controller 108 counts the number of actually received beacons in the training time period when the radio 102 is transmitting training signals on the first channel. Also, the interference mitigation controller 108 may calculate the number of expected beacons in the training time period based on the known frequency of the beacons. The interference mitigation controller 108 compares the number of actually received beacons with the number of expected beacons to determine the impact or strength of the out-of-channel interference caused by the transmitted training signals from the radio 102. For example, if the number of actually received beacons is significantly less than the number of expected beacons, it indicates that the out-of-channel interference caused by the radio 102 is strong.

In another embodiment, the neighboring AP 300 is not assigned to transmit signals on the second channel—i.e., the channel used by the radio 103. Instead, the neighboring AP 300 is assigned a different channel to transmit signals. That is, the neighboring AP 300 does not normally transmit signals on the second channel. In this embodiment, the interference mitigation controller 108 instructs the neighboring AP 300 to intermittently switch its radio to the second channel and transmit a sequence of known testing frames (e.g., with a known frequency) to the radio 103 on the second channel during the training period. Similarly as above, at block 205, the radio 103 may not receive all the known testing frames from the neighboring AP 300 due to the out-of-channel interference. The interference mitigation controller 108 compares the number of actually received frames with the number of expected frames in the training time period to determine the impact or strength of the out-of-channel interference caused by the transmitted training signals from the radio 102.

In another embodiment, the network device 300 is a client device, e.g., a cell phone. In this embodiment, the radio 103 in the AP 100 receives signals from the client device 300. In one embodiment, the controller 108 uses the radio 103 to send requests to the client device 300 to send known uplink testing signals or frames to the radio 103 on the second channel. For example, the radio 103 sends one or more Request-to-Send (RTS) messages to the client device 300 and thus expects to receive one or more Clear-to-Send (CTS) messages from the client device 300. Similarly as above, at block 205, the radio 103 may not receive all the CTS messages from the client device 300 due to the out-of-channel interference. The interference mitigation controller 108 compares the number of actually received CTS messages with the number of expected CTS messages in the training time period to determine the impact or strength of the out-of-channel interference caused by the transmitted training signals from the radio 102. In another example, the radio 103 sends one or more Block Acknowledgement Request (BAR) messages to the client device 300 and thus expects to receive one or more Block Acknowledgement response (BA) messages from the client device 300. In another example, the radio 103 sends one or more Ping messages to the client device 300 and thus expects to receive one or more Ping reply messages from the client device 300.

In one embodiment, at block 206, the interference mitigation controller 108 derives a cost function $F_c$ indicating the impact of the out-of-channel interference. In one embodiment, the cost function $F_c$ includes a parameter indicating the impact or strength of the out-of-channel interference. For example, $F_c$ can be the ratio between the number of actually received beacons from the neighboring AP 300 and the number of expected beacons in the training time period In this example, $F_c$ can be expressed as Equation (1) below:

$$F_c = \frac{\text{number of beacons received}}{\text{number of expected beacons}} \qquad (1)$$

In other embodiments, the cost function includes other parameters indicating the impact or strength of the out-of-channel interference. For example, $F_c$ may include noise floor or SNR detected at the radio 103 when radio 102 is transmitting training signals on the first channel in the training time period. In another example, $F_c$ may include number of received training frames transmitted from the radio 102 in the training time period. In another example, $F_c$ may include an estimation of duty cycle of received training frames transmitted from the radio 102 in the training time period. In another example, may include the ratio between cyclic redundancy check (CRC) errors of the received frames and energy detection (ED) events or the ratio between CRC errors and Start of Packet (SOP) detection events in the training time period.

In one embodiment, the cost function $F_c$ includes multiple parameters indicating the impact or strength of the out-of-channel interference. For example, the cost function $F_c$ may include both noise floor and the ratio between CRC errors and SOP detection events. The interference mitigation controller 108 can derive other examples of the cost function $F_c$ including multiple parameters, as understood in the art.

In one embodiment, after the cost function $F_c$ is derived, at block 206, the interference mitigation controller 108 determines filter coefficients of the receiving filter for the receiving the radio 103 by maximizing or minimizing the cost function $F_c$. In other words, the interference mitigation controller 108 finds the optimal filter coefficients that maximizes or minimizes the cost function $F_c$.

In one embodiment, the interference mitigation controller 108 maximizes or minimizes the cost function $F_c$ based on a gradient search approach. In this example, assume the receiving filter is a $1 \times N_r$ vector W, where Nr is the number of antennas 105 that receive signals for the radio 103. Further, the received signals by Nr antennas 105 at the radio 103 in the training time period can be represented by an $N_r \times 1$ vector R. The interference mitigation controller 108 applies vector W to vector R as WR and calculates the value of the cost function $F_c$ as $F_c$ (WR). In other words, the cost function $F_c$ is a function of W. At block 206, the interference mitigation controller 108 uses the gradient search approach to find an optimal W that maximizes or minimizes the value of the cost function $F_c$ (WR).

In one embodiment, assume that the cost function $F_c$ (WR) is defined as the ratio between CRC errors of the received frames and ED events in the training time period, as mentioned above. The optimal W for this cost function is the W that minimizes the value of this cost function $F_c$ (WR), which mitigates the out-of-channel interference the most.

The gradient search approach is an iterative algorithm. In the first iteration, an initial value of W is set. For example, the initial W can be a 1×Nr vector $W_0$ that all the elements in the vector are 1, i.e., $W_0$=[1, 1, . . . , 1].

With $W_0$, the interference mitigation controller 108 calculates the differentiation (gradient) of $F_c$ (WR) as Equation (2) below:

$$\Delta(W_0) = \frac{dF_c(WR)}{dW}\bigg|_{W=W_0} \quad (2)$$

where $\Delta(W_0)$ is the gradient of $F_c$ (WR) when $W=W_0$, and d represents the differentiation operator.

With $\Delta(W_0)$, the interference mitigation controller 108 calculates the value of W for the second iteration as Equation (3) below:

$$W_1 = W_0 - \gamma \Delta(W_0) \quad (3)$$

where γ is a step size, which can be a number, e.g., 0.1, and can be changed in each iteration. After the first iteration, $F_c$ ($W_1$R)<$F_c$($W_0$R).

Similarly, in the second iteration, the interference mitigation controller 108 calculates the differentiation $\Delta(W_1)$ of $F_c$ (WR) based on Equation (2) with $W=W_1$ and calculates $W_2$ for the third iteration based on Equation (3). After the second iteration, $F_c$ ($W_2$R)<$F_c$ ($W_1$R).

After N iterations, the value of $F_c$ (WR) eventually converges to a minimum value $F_c$ ($W_N$R) and the value of W after N iterations, i.e., $W_N$, is the optimal receiving filter that minimizes $F_c$ (WR).

In other embodiments, at block 206, the interference mitigation controller 108 can utilize the gradient search approach to find an optimal W that maximizes or minimizes the value of different cost functions $F_c$ (WR), as understood in the art.

At block 207, the interference mitigation controller 108 applies the determined receiving filter to the signals received by the receiving radio. In one embodiment, the interference mitigation controller 108 applies the determined receiving filter to only signals received by the receiving radio during a time period that the transmit radio (e.g., the radio 102) is transmitting signals in the frequency band while the receiving radio is receiving signals in the same frequency band. In one embodiment, the interference mitigation controller 108 disables the use of the receiving filter when there is no out-of-channel interference between the two radios, i.e., when the two radios are not working simultaneously in the same frequency band.

In one embodiment, at block 207, the interference mitigation controller 108 applies $W_N$ to the received signals R' at the radio 103 as Equation (4) below:

$$R''=W_N R' \quad (4)$$

where R' is an Nr×1 vector representing the received signals captured at Nr receiving antennas 105. In one embodiment, R' includes two components. One component is the data signals transmitted to the radio 103, e.g., from client devices. Another component is the out-of-channel interference from the radio 102 because when the radio 103 is receiving data signals on the second channel, the radio 102 is simultaneously transmitting signals on the first channel, which causes out-of-channel interference to the data signals received by the radio 103. R" is a complex number representing the filtered signals received by the radio 103 including the data signals and the mitigated out-of-channel interference.

Figure 4:
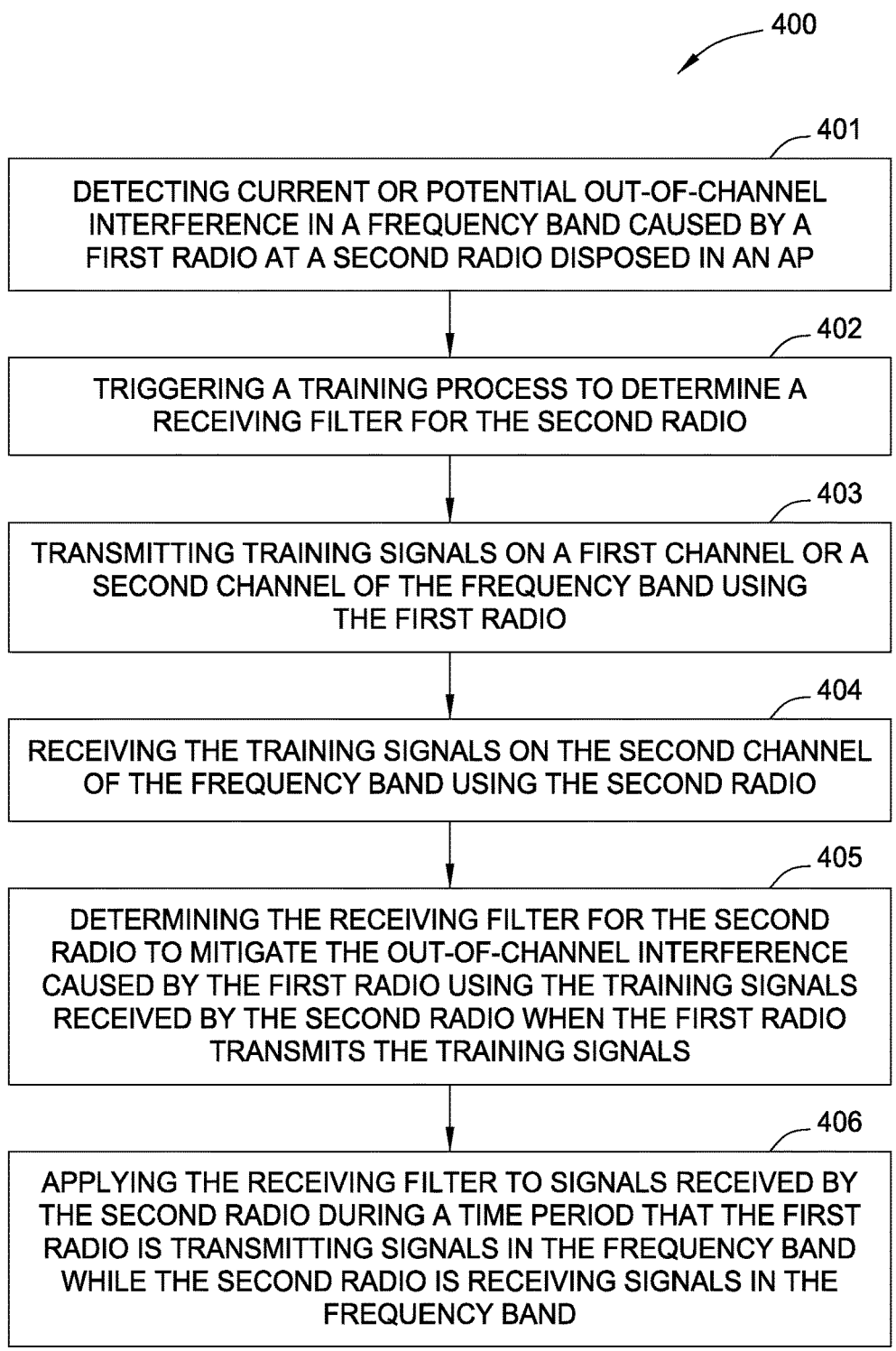
FIG. 4 illustrates a method to determine a receiving filter for the AP, according to another embodiment herein.

FIG. 4 illustrates a method for determining a receiving filter for the AP, according to another embodiment herein. Similarly as in FIG. 2, in FIG. 4, at block 401, the interference mitigation controller 108 detects current or potential out-of-channel interference in a frequency band, e.g., the 5 GHz frequency band, caused by the radio 102 at the radio 103. After detecting current or potential out-of-channel interference at block 402, the interference mitigation controller 108 triggers a training process to determine a receiving filter for the radio 103. In response, the interference mitigation controller 108 initiates the training process from block 403 to block 406 to determine the receiving filter for the radio 103, as described below.

Figure 5:
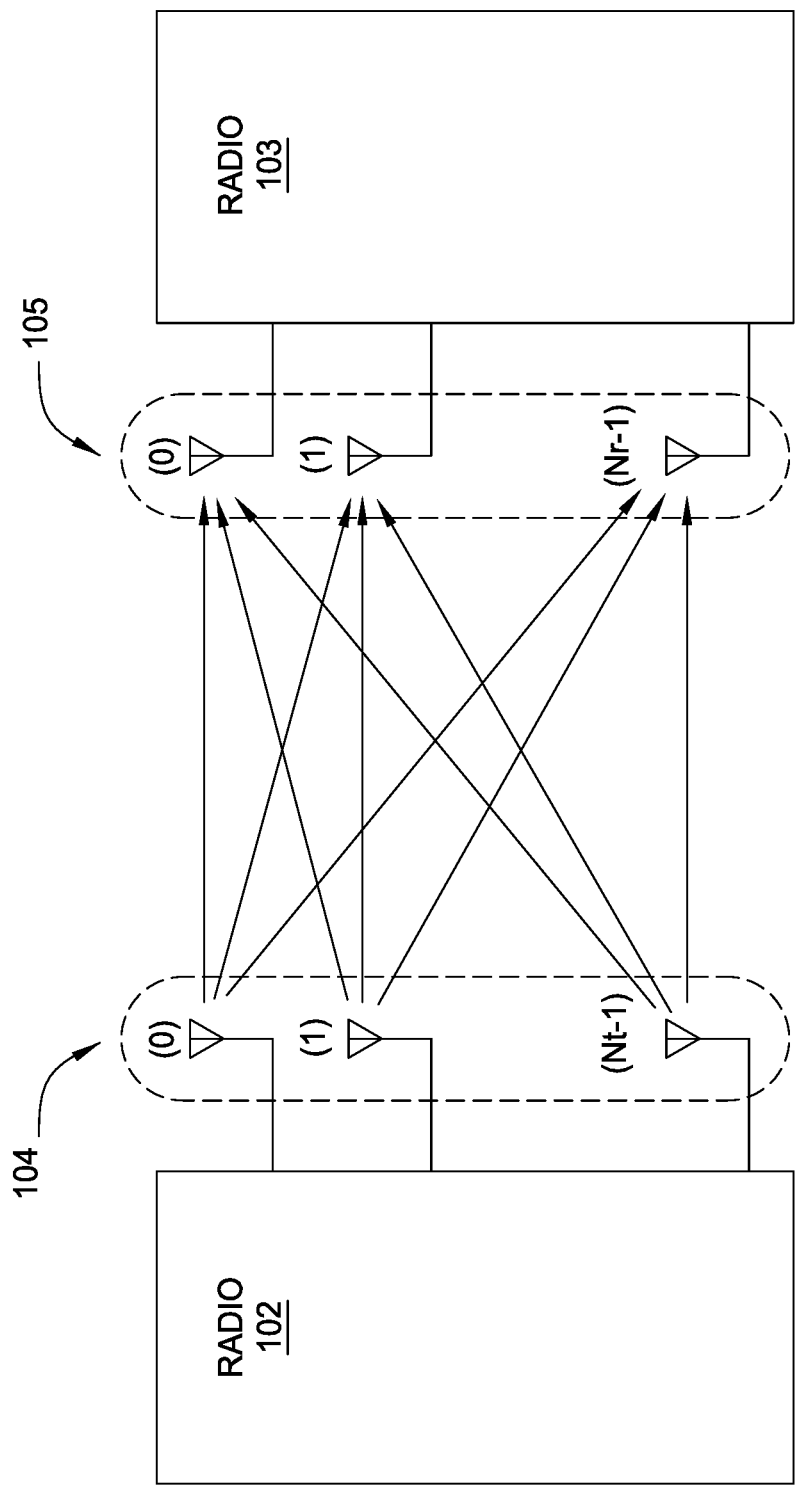
FIG. 5 shows that a first radio in the AP transmits signals while a second radio in the AP receives the signals transmitted from the first radio, according to one embodiment herein.

FIG. 5 shows that the radio 102 transmits training signals while the radio 103 receives the training signals in the same frequency band, according to one embodiment herein. As shown in FIG. 5, at block 403, the radio 102 transmits training signals via antennas 104, where antennas 104 include antenna 0 to antenna Nt−1. At block 404, the radio 103 receives the training signals via antennas 105, where antennas 105 include Nr antennas from antenna 0 to antenna Nr−1. Nt and Nr can be the same number or can be two different numbers.

At block 403, the interference mitigation controller 108 controls the radio 102 to transmit training signals in the frequency band. In one embodiment, the interference mitigation controller 108 controls the radio 102 to transmit training signals on a first channel, which is different from the second channel used by the radio 103. However, in another embodiment, the interference mitigation controller 108 controls the radio 102 to transmit training signals on the second channel, which is the same channel used by the radio 103 to receive wireless signals. At block 404, the radio 103 receives the training signals on the second channel.

In one embodiment, the radio 103 transmits a CTS-to-self frame to itself to reserve the second channel for a time period. During the reserved time period, other APs and client devices using the second channel in the coverage area of AP 100 cannot transmit signals. During the reserved time period, at block 403, the radio 102 transmits training signals on the first channel. That is, in this embodiment, the radio 102 transmits training signals on a different channel than the one used by the radio 103. Simultaneously, during the reserved time period, at block 404, the radio 103 receives the training signals on the second channel. Since other APs and client devices using the second channel cannot transmit signals, the radio 103 only receives the training signals transmitted from the radio 102 that leak into the second channel during the reserved time period. That is, the radio 103 only receives out-of-channel interference caused by the training signals from the radio 102. As mentioned above, the training signals can include constant and/or nearly 100% high duty cycle frames on the first channel for the reserved time period.

In one embodiment, upon receiving the transmitted training signals from the radio 102, i.e., the out-of-channel interference from the radio 102, the radio 103 captures the In-Phase Quadrature (IQ) samples of the baseband received signals in time domain. The IQ samples of the received signals in time domain can be expressed as Equation (5) below:

$$r[n]=[r_0(n),r_1(n),\ldots,r_{Nr-1}(n)] \quad (5)$$

where r[n] is a 1×Nr vector, n is the discrete time index of the sampling time, and $r_i(n)$ is the IQ sample captured at antenna i of antennas 105 at time index n (i=0, 1, . . . Nr−1). $r_i(n)$ is a complex number representing the combination or summation of sampled received signals at antenna i transmitted from all antennas 104 at time index n, as indicated by arrows in FIG. 5.

In one embodiment, at block 405, the interference mitigation controller 108 calculates the covariance matrix of [n]:$r^H[n]r[n]$, where H represents conjugate transpose and $r^H[n]r[n]$ is an Nr×Nr covariance matrix. The interference mitigation controller 108 calculates a summation of the covariance matrices of r[n] for multiple discrete time indices during the reserved time period as Equation (6) below:

$$C=\Sigma_n r^H[n]r[n] \quad (6)$$

where C represents the summation of the covariance matrices of r[n] for multiple or all discrete time indices n during the reserved time period. That is, C is an Nr×Nr matrix representing the summation of multiple covariance matrices $r^H[n]r[n]$ when n has different values indicating different time indices during the reserved time period.

In one embodiment, at block 405, the interference mitigation controller 108 determines the receiving filter for the radio 103 by calculating the singular vectors of C by applying Singular Value Decomposition (SVD) to C as Equation (7) below:

$$C=UDV^H \quad (7)$$

where U is an Nr×Nr unitary matrix, D is an Nr×Nr diagonal matrix comprising eigenvalues of C, V is an Nr×Nr unitary matrix comprising eigenvectors of C and H represents conjugate transpose.

The diagonal matrix D can be expressed as Equation (8) below:

$$D = \begin{vmatrix} d_0 & & & \\ & d_1 & & \\ & & \ddots & \\ & & & d_{Nr-1} \end{vmatrix} \quad (8)$$

where the diagonal matrix elements from $d_0$ to $d_{Nr-1}$ are eigenvalues of C.

Matrix V can be expressed as Equation (9) below:

$$V=|V_0\ V_1\ \ldots\ V_{Nr-1}| \quad (9)$$

where matrix elements from $V_0$ to $V_{Nr-1}$ are eigenvectors of C, and each eigenvector is an Nr×1 vector.

In one embodiment, at block 405, the interference mitigation controller 108 selects the singular vector in V associated with the smallest (lowest value) eigenvalue in D as filter coefficients for the receiving filter. For purpose of explanation, $DV^H$ can be written as Equation (10) below:

$$DV^H = \begin{vmatrix} d_0 & & & \\ & d_1 & & \\ & & \ddots & \\ & & & d_{Nr-1} \end{vmatrix} \begin{vmatrix} V_0^H \\ V_1^H \\ \vdots \\ V_{Nr-1}^H \end{vmatrix} = \begin{vmatrix} d_0 V_0^H \\ d_1 V_1^H \\ \vdots \\ d_{Nr-1} V_{Nr-1}^H \end{vmatrix} \quad (10)$$

From the above Equation (10), eigenvector $V_0$ is associated with eigenvalue $d_0$, and similarly eigenvector $V_1$ is associated with eigenvalue $d_1$ and so on. In one embodiment, diagonal elements in D can be sorted so that $d_0 \leq d_1 \leq \ldots \leq d_{Nr-1}$.

Assuming eigenvalue $d_0$ is the smallest eigenvalue among eigenvalues from $d_0$ to $d_{Nr-1}$, the interference mitigation controller 108 selects $V_0$ as the filter coefficients for the receiving filter. The Nr×1 vector $V_0$ can be expressed as Equation (11) below:

$$V_0 = \begin{vmatrix} V_0(0) \\ V_0(1) \\ \vdots \\ V_0(Nr-1) \end{vmatrix} \quad (11)$$

where $V_0(0)$ is the receiving filter coefficient for received signals at antenna 0 of antennas 105, and similarly $V_1(0)$ is the receiving filter coefficient for received signals at antenna 1 of antennas 105 and so on. By selecting $V_0$ as the filter coefficients for the receiving filter, when the received signals include out-channel-interference, the multiplication of $V_0$ and the out-channel-interference is close to zero, thus, the out-of-channel interference is mitigated.

In another embodiment, the interference mitigation controller 108 selects multiple singular vectors in V associated with multiple smallest eigenvalues in D as filter coefficients for the receiving filter. For example, assuming eigenvalues $d_0$ and $d_1$ are the two smallest eigenvalues among eigenvalues from $d_0$ to $d_{Nr-1}$, the interference mitigation controller 108 selects $V_0$ and $V_1$ as two sets of the filter coefficients for the receiving filter. In one embodiment, the interference mitigation controller 108 applies the selected multiple eigenvectors (e.g., $V_0$ and $V_1$) to the received signals separately, and combines the separately filtered received signals to form the final received signals for demodulation and/or decoding purposes.

In one embodiment, the interference mitigation controller 108 selects multiple singular vectors in V associated with multiple smallest eigenvalues in D as filter coefficients for the receiving filter based on a threshold. For example, the interference mitigation controller 108 selects multiple singular vectors in V associated with multiple smallest eigenvalues in D when the multiple smallest eigenvalues are all smaller than a specified value.

After the receiving filter is determined, at block 406, the interference mitigation controller 108 applies the determined receiving filter to the signals received by the receiving radio.

For example, assuming $V_0$ is selected as the filter coefficients for the radio 103, the interference mitigation controller 108 applies $V_0$ to time domain IQ samples at each receiving antenna from antenna 0 to antenna Nr−1 as Equation (12) below:

$$r''[n']=r'[n']V_0 \quad (12)$$

where r'[n'] is an 1×Nr vector representing the filtered IQ samples captured at receiving antennas 105 from antenna 0 to antenna Nr−1 at time index n' (similarly as r[n] in Equation (1)). In one embodiment, r'[n'] includes two components. One component is the data signals transmitted to the radio 103, e.g., from client devices. Another component is the out-of-channel interference from the radio 102. r''[n'] is a complex number representing the filtered received IQ sample at time index n' received by the radio 103 including the data signals and the mitigated out-of-channel interference.

The embodiment above discloses that the interference mitigation controller 108 determines filter coefficients for the receiving filter based on time domain IQ samples, thus, the receiving filter is a time domain filter and the filter coefficients of the time domain filter are determined for each receiving antenna.

In another embodiment, instead of the radio 102 in FIG. 5 transmitting training signals on a different channel than the one used by the radio 103, at block 403, the radio 102 transmits training signals on the second channel during the reserved time period, and at block 404, the radio 103 receives the training signals on the second channel during the reserved time period. In this embodiment, because the radio 102 transmits training signals on the same channel as the radio 103, the radio 103 can estimate the frequency domain channel coefficients between the radio 102 and the radio 103. For example, the radio 102 can transmit training symbols that are known to the radio 103 and the radio 103 can estimate the frequency domain channel coefficients based on the known training symbols. Based on the estimated frequency domain channel coefficients, the interference mitigation controller 108 can determine frequency domain filter coefficients for the receiving filter. That is, the interference mitigation controller 108 can determine a frequency domain filter.

In one embodiment, at block 403, the radio 102 transmits known training symbols represented by a vector S through all the antennas 104 from antenna 0 to antenna Nt−1. In one embodiment, S is an Orthogonal Frequency Division Multiplexing (OFDM) symbol. The OFDM symbol S is transmitted from the radio 102 to the radio 103 in time domain. At block 404, the radio 103 receives the time domain OFDM symbol S and performs Fast Fourier Transform (FFT) to transform S from time domain to frequency domain for further processing, as understood in the art.

In frequency domain, S can be expressed as Equation (13) below:

$$S = \begin{vmatrix} S(0) \\ S(1) \\ \vdots \\ S(M-1) \end{vmatrix} \quad (13)$$

where S has M subcarriers (sub-channels of the second channel), and S(0) is the training symbol on subcarrier 0, and similarly S(1) is the training symbol on subcarrier 1 and so on.

Considering one subcarrier k (0≤k≤ . . . ≤M−1), in frequency domain, the received symbol vector R(k) at all receiving antennas on subcarrier k for the radio 103 can be expressed as Equation (14) below:

$$R(k) = H(k)X(k) = \begin{vmatrix} H_{0,0}(k) & H_{0,1}(k) & \ldots & H_{0,Nt-1}(k) \\ H_{1,0}(k) & H_{1,1}(k) & \ldots & H_{1,Nt-1}(k) \\ \vdots & \vdots & \ddots & \vdots \\ H_{Nr-1,0}(k) & H_{Nr-1,1}(k) & \ldots & H_{Nr-1,Nt-1}(k) \end{vmatrix} \begin{vmatrix} S(k) \\ S(k) \\ \vdots \\ S(k) \end{vmatrix} \quad (14)$$

where R(k) is an Nr×1 vector representing the frequency domain received symbols at the radio 103 on subcarrier k on the second channel, H(k) is an Nr×Nt matrix representing the frequency domain channel between the radio 102 and the radio 103 on subcarrier k. For example, $H_{0,0}(k)$ is the complex channel coefficient between transmit antenna 0 of antennas 104 and receiving antenna 0 of antennas 105 on subcarrier k, and similarly $H_{Nr-1,Nt-1}(k)$ is the complex channel coefficient between transmit antenna Nt−1 of antennas 104 and receiving antenna Nr−1 of antennas 105 on subcarrier k, and so on. X(k) is an Nt×1 vector including the frequency domain training symbol S(k) transmitted by transmit antennas from antenna 0 to antenna Nt−1 on subcarrier k.

Since S(k) is a known training symbol to the radio 103, based on the received symbol vector R(k), the interference mitigation controller 108 can estimate H(k), as understood in the art.

Similarly as Equation (7), when H(k) is estimated, at block 405, the interference mitigation controller 108 calculates the singular vectors of the covariance matrix $H(k)^H H(k)$ of H(k) by applying SVD to $H(k)^H H(k)$ as Equation (15) below:

$$H(k)^H H(k) = \overline{U}(k)\overline{D}(k)\overline{V}(k)^H \quad (15)$$

where $\overline{U}(k)$ is an Nr×Nr unitary matrix, $\overline{D}(k)$ is an Nr×Nr diagonal matrix comprising eigenvalues of $H(k)^H H(k)$, $\overline{V}(k)$ is an Nr×Nr unitary matrix comprising eigenvectors of $H(k)^H H(k)$ and H represents conjugate transpose.

Similarly as explained above, at block 405, the interference mitigation controller 108 selects one or multiple singular vectors in $\overline{V}(k)$ associated with one or multiple smallest eigenvalues in $\overline{D}(k)$ as filter coefficients of the receiving filter for the radio 103 on subcarrier k. In this way, the interference mitigation controller 108 can determine filter coefficients of the receiving filter for the radio 103 on each subcarrier from subcarrier 0 to subcarrier M−1, respectively. In another embodiment, the interference mitigation controller 108 determines the receiving filter for the radio 103 by calculating the singular vectors of the channel matrix H(k), as understood in the art.

After the receiving filter is determined, at block 406, the interference mitigation controller 108 applies the determined receiving filter for each subcarrier to the signals received by the receiving radio.

For example, assuming $\overline{V}_0(k)$ is a Nr×1 vector in $\overline{V}(k)$ and is selected as the filter coefficients for the radio 103 on subcarrier k, the interference mitigation controller 108 applies $\overline{V}_0(k)$ to Nr×1 frequency domain received symbol vector R'(k) on subcarrier k as Equation (16) below:

$$R''(k) = \overline{V}_0(k)^T R'(k) \quad (16)$$

where T represents transpose. In one embodiment, R'(k) includes two components. One component is the frequency domain data symbols transmitted to the radio 103, e.g., from client devices on subcarrier k. Another component is frequency domain out-of-channel interference from the radio 102 to the data symbols received by the radio 103 on subcarrier k. R''(k) represents the filtered received signals in frequency domain including the data symbols and the mitigated out-of-channel interference on subcarrier k. In this way, the interference mitigation controller 108 applies the determined receiving filter for each subcarrier to the signals received by the receiving radio.

The embodiment above discloses that the interference mitigation controller 108 determines filter coefficients for the receiving filter based on frequency domain channel matrix, thus, the receiving filter is a frequency domain filter. Also, the filter coefficients of the frequency domain filter are determined for each receiving antenna on each subcarrier.

The embodiments described in FIG. 4 and FIG. 5 can be used separately or can be combined. For example, the interference mitigation controller 108 can first determine the time domain receiving filter to mitigate part of the out-of-channel interference at each receiving antenna in time domain, and then the interference mitigation controller 108 can determine the frequency domain receiving filter to further mitigate the out-of-channel interference on each subcarrier in frequency domain.

Figure 6:
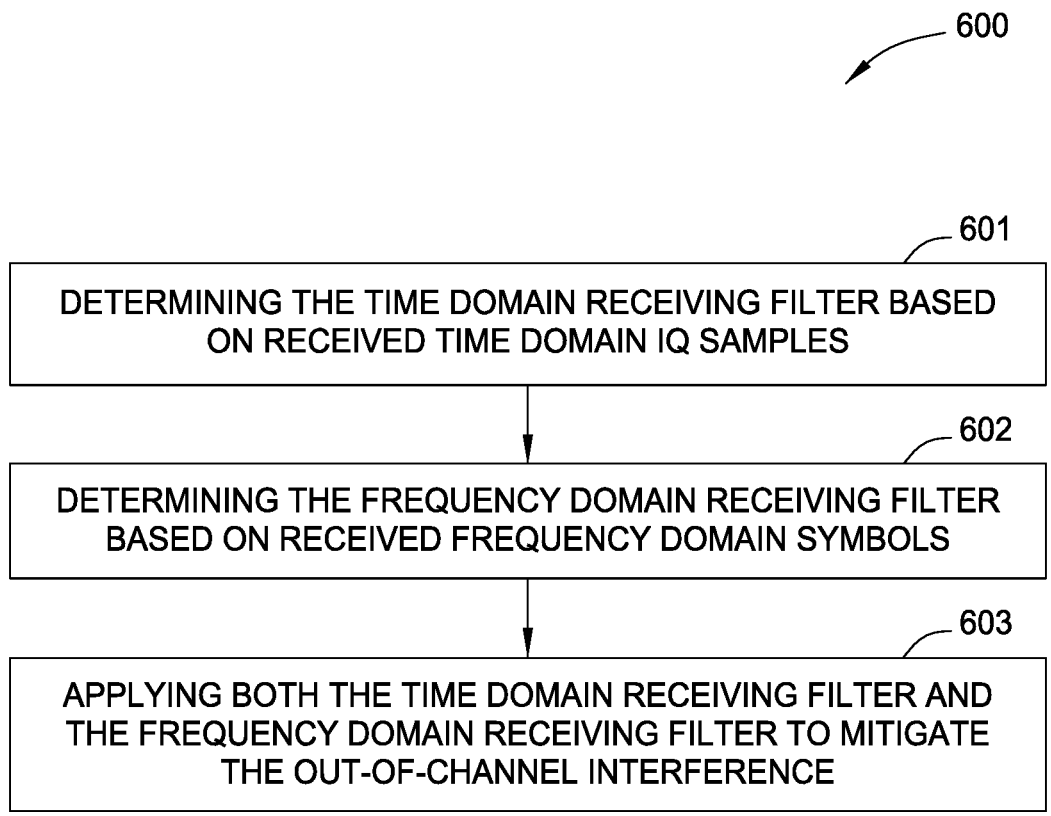
FIG. 6 shows a flowchart to apply both a time domain receiving filter and a frequency domain receiving filter, according to one embodiment herein.

FIG. 6 shows a flowchart 600 to apply both the time domain receiving filter and the frequency domain receiving filter, according to one embodiment herein. At block 601, the interference mitigation controller 108 determines the time domain receiving filter based on received time domain IQ samples, as explained above. At block 602, the interference mitigation controller 108 determines the frequency domain receiving filter based on received frequency domain symbols, as explained above. At block 603, the interference mitigation controller 108 applies both the time domain receiving filter and the frequency domain receiving filter to mitigate the out-of-channel interference. In another embodiment, the interference mitigation controller 108 can first determine the frequency domain receiving filter and then determined the time domain receiving filter.

Although the above embodiments determine a receiving filter for the radio 103, the above embodiments can be similarly used to determine a receiving filter for the radio 102, when the radio 102 is receiving signals while the radio 103 is transmitting signals in the same frequency band, as understood in the art.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the preceding, reference is made to embodiments presented in this disclosure. However, the scope of the present disclosure is not limited to specific described embodiments. Instead, any combination of the following features and elements, whether related to different embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. An access point, comprising:
   a body;
   a first radio disposed in the body and configured to transmit first signals in a frequency band that includes at least a first channel and a second channel different from the first channel;
   a second radio disposed in the body and configured to receive second signals in the frequency band;
   a controller configured to:
      train a receiving filter for the second radio to mitigate interference between the first radio and the second radio on the second channel of the frequency band, wherein training the receiving filter comprises:
         transmitting a request to transmitting devices, other than the first radio, to not transmit signals in the frequency band during a reserved time period, wherein the request comprises a Clear-to-Send-to-self frame;
         transmitting a training signal, by the first radio on the first channel in the frequency band during the reserved time period, and
         adjusting the receiving filter to decrease reception of testing signals received by the second radio on the second channel during the reserved time period in which the first radio is transmitting the training signal, wherein the testing signals are portions of the training signal that leak into the second channel during the reserved time period;
      apply the receiving filter to signals received by the second radio in response to determining that the first radio is currently transmitting the first signals while the second radio is receiving the second signals; and
      remove the receiving filter from signals received by the second radio in response to determining that the first radio is not currently transmitting signals.

2. The access point of claim 1, wherein the frequency band comprises a 5 GHz Wi-Fi frequency band.

3. The access point of claim 1, wherein the first radio is configured to transmit the first signals in the frequency band through a first plurality of antennas disposed on the body, and wherein the second radio is configured to receive the second signals in the frequency band through a second plurality of antennas disposed on the body.

4. The access point of claim 1, wherein the first radio is configured to transmit the first signals on the first channel in the frequency band and wherein the second radio is configured to receive the second signals on the second channel in the frequency band.

5. The access point of claim 1, wherein the controller is further configured to:
   determine a time domain receiving filter and a frequency domain receiving filter for the second radio; and
   apply the time domain receiving filter and the frequency domain receiving filter in response to determining that the first radio is transmitting the first signals in the frequency band while the second radio is receiving the second signals in the frequency band.

6. A computer program product, comprising:
a non-transitory computer-readable storage medium having computer readable program code embodied therewith, wherein the computer readable program code is configured to:
train, for an access point comprising a first radio and a second radio, a receiving filter for the second radio to mitigate interference between the first radio and the second radio on a second channel of a frequency band including at least a first channel and the second channel, wherein the first radio is disposed in a body of the access point and configured to transmit first signals in the frequency band, and wherein the second radio is disposed in the body of the access point and configured to receive second signals in the frequency band, wherein training the receiving filter comprises:
transmitting a request to transmitting devices, other than the first radio, to not transmit signals in the frequency band during a reserved time period, wherein the request comprises a Clear-to-Send-to-self frame;
transmitting a training signal, by the first radio on the first channel in the frequency band during the reserved time period, and
adjusting the receiving filter to decrease reception of testing signals received by the second radio on the second channel during the reserved time period in which the first radio is transmitting the training signal, wherein the testing signals are portions of the training signal that leak into the second channel during the reserved time period;
apply the receiving filter to the second signals in response to determining that the first radio is currently transmitting the first signals while the second radio is receiving the second signals; and
remove the receiving filter from the second signals in response to determining that the first radio is not currently transmitting the first signals.

7. The computer program product of claim 6, wherein the frequency band comprises a 5 GHz Wi-Fi frequency band.

8. The computer program product of claim 6, wherein the first radio is configured to transmit the first signals in the frequency band through a first plurality of antennas disposed on the body, and wherein the second radio is configured to receive the second signals in the frequency band through a second plurality of antennas disposed on the body.

9. The computer program product of claim 6, wherein the first radio is configured to transmit the first signals on the first channel in the frequency band and wherein the second radio is configured to receive the second signals on the second channel in the frequency band.

10. The computer program product of claim 6, wherein the computer readable program code is further configured to:
determine a time domain receiving filter and a frequency domain receiving filter for the second radio; and
apply the time domain receiving filter and the frequency domain receiving filter in response to determining that the first radio is transmitting the first signals in the frequency band while the second radio is receiving the second signals in the frequency band.

11. A method, comprising:
transmitting first signals in a frequency band that includes at least a first channel and a second channel different from the first channel by a first radio disposed in a body of an access point;
receiving second signals in the frequency band by a second radio disposed in the body of the access point;
training a receiving filter for the second radio to mitigate interference between the first radio and the second radio on the second channel of the frequency band, wherein training the receiving filter comprises:
transmitting a request to transmitting devices, other than the first radio, to not transmit signals in the frequency band during a reserved time period, wherein the request comprises a Clear-to-Send-to-self frame;
transmitting a training signal, by the first radio on the first channel in the frequency band during the reserved time period, and
adjusting the receiving filter to decrease reception of testing signals received by the second radio on the second channel during the reserved time period in which the first radio is transmitting the training signal, wherein the testing signals are portions of the training signal that leak into the second channel during the reserved time period;
applying the receiving filter to the second signals in response to determining that the first radio is currently transmitting the first signals while the second radio is receiving the second signals; and
removing the receiving filter from the second signals in response to determining that the first radio is not currently transmitting the first signals.

12. The method of claim 11, further comprising:
transmitting the first signals in the frequency band through a first plurality of antennas disposed on the body; and
receiving the second signals in the frequency band through a second plurality of antennas disposed on the body.

13. The method of claim 11, further comprising:
transmitting the first signals on the first channel in the frequency band; and
receiving the second signals on the second channel in the frequency band.

14. The method of claim 11, further comprising:
determining a time domain receiving filter and a frequency domain receiving filter for the second radio; and
applying the time domain receiving filter and the frequency domain receiving filter in response to determining that the first radio is transmitting signals in the frequency band while the second radio is receiving signals in the frequency band.

\* \* \* \* \*

UNITED STATES PATENT AND TRADEMARK OFFICE
CERTIFICATE OF CORRECTION

PATENT NO. : 10,340,975 B2  
APPLICATION NO. : 15/379726  
DATED : July 2, 2019  
INVENTOR(S) : Matthew A. Silverman et al.

Page 1 of 1

It is certified that error appears in the above-identified patent and that said Letters Patent is hereby corrected as shown below:

In the Specification

In Column 6, Line 31, after "function" insert -- $F_c$ --.

In Column 6, Line 41, after "example," insert -- $F_c$ --.

Signed and Sealed this  
Third Day of September, 2019

Andrei Iancu  
*Director of the United States Patent and Trademark Office*